(12) United States Patent
Hoffmann et al.

(10) Patent No.: US 6,385,555 B1
(45) Date of Patent: May 7, 2002

(54) METHOD AND DEVICE FOR DETERMINING THE ROTATIONAL SPEED OF A POLYPHASE MACHINE OPERATING WITH FIELD ORIENTATION AND WITHOUT A SENSOR

(75) Inventors: Frank Hoffmann, Höchstadt; Manfred Depenbrock, Bochum, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/308,016

(22) PCT Filed: Nov. 6, 1997

(86) PCT No.: PCT/DE97/02571

§ 371 Date: Aug. 13, 1999

§ 102(e) Date: Aug. 13, 1999

(87) PCT Pub. No.: WO98/21817

PCT Pub. Date: May 22, 1998

(30) Foreign Application Priority Data

Nov. 11, 1996 (DE) .......................... 196 46 457

(51) Int. Cl.⁷ ................................. G01P 3/46

(52) U.S. Cl. ...................... 702/145; 388/806

(58) Field of Search ............... 702/145, 147, 702/64, 96; 388/801, 803, 806, 822, 823, 842, 843, 847, 848, 849; 310/191; 361/139, 143, 236; 318/3, 4, 8, 563, 565, 568, 572, 650, 34, 59, 66, 67, 68, 69, 70, 71, 72, 90, 97, 700, 712, 714, 716, 717, 718, 747, 767, 780, 799, 812, 268, 804, 805, 823

(56) References Cited

U.S. PATENT DOCUMENTS 5,654,620 A * 8/1997 Langhorst .................. 318/716
5,811,957 A * 9/1998 Bose et al. .................. 318/802
5,854,548 A * 12/1998 Taga et al. .................. 318/721
5,994,867 A * 11/1999 Birk et al. .................. 318/609
5,998,946 A * 12/1999 Kim ........................... 318/254
6,243,532 B1 * 6/2001 Wacker et al. .............. 388/811
6,262,550 B1 * 7/2001 Kliman et al. .............. 318/565

FOREIGN PATENT DOCUMENTS

| DE | 32 34 603 | 3/1984 |
| DE | 195 31 771 | 3/1997 |
| EP | 0 436 138 | 7/1991 |

OTHER PUBLICATIONS

Uwe Baader et al., "Direct Self Control (DSC) of Inter–Fed Induction Machine: A Basis for Speed Control Without Speed Measurement," IEEE Transaction on Industry Applications 28 (1992) May/Jun., No. 3, pp. 581–588.

J. Jiang et al., "Speed Sensorless AC Drive for High Dynamic Performance and Steady State Accuracy," IEEE IECON, Nov. 6, 1995, pp. 1029–1034.

(List continued on next page.)

Primary Examiner—Marc S. Hoff
Assistant Examiner—Edward Raymond (57) ABSTRACT

The invention relates to A method for determining a rotational velocity of a transducerless polyphase machine that is operated in a field-oriented manner, a stator-current model space vector and a conjugate complex reference space vector being calculated using a complete machine model, and the torques-active and dummy variables being measured from these model space vectors and from the measured stator-current actual space vector, from which active and dummy variables, in each case, a system deviation is determined. These measured system deviations are weighted and finally totaled, this total system deviation being used for adjusting the model rotor angular velocity such that the total system deviation becomes zero. Thus a method for determining the rotational velocity of a transducerless polyphase machine that is operated in a field-oriented manner is possible, breakdown protection being assured.

17 Claims, 4 Drawing Sheets

OTHER PUBLICATIONS

Fang–Zheng Peng et al., "Robust Speed Identification for Speed–Sensorless Vector Control of Induction Motors," IEEE Transactions on Industry Applications 30 (1994) Sep., No. 5, pp. 1234–1240.

Colin Schauder, "Adaptive Speed Identification for Vector Control of Induction Motors Without Rotational Transducers," IEEE Transactions on Industry Applications, vol. 28, No. 5, Sep./Oct. 1992, pp. 1054–1061.

M. Boussak et al., "Speed Measurement in Vector–Controlled Induction Machine by Adaptice Method," EPE–Konferenzband 3, Firenze 1991, pp. 653–658.

Hisao Kubota et al., "DSP–Based Speed Adaptive Flux Observer of Induction Motor," IEEE Transactions on Industry Applications, vol. 29, No. 2, Mar./Apr. 1993, pp. 344–348.

Hisai Kubota et al., "Speed Sensorless Field–Oriented Control of Induction Motor with Rotor Resistance Adaptation," IEEE Transactions of Industry Applications, vol. 30, No. 5, Sep./Oct. 1994, pp. 1219–1224.

Hidehiko Sugimoto et al., "Secondary Resistance Identification of an Induction–Motor Applied Model Reference Adaptive System and Its Characteristics," IEEE Transactions on Industry Applicaitons, vol. IA–23, No. 2, Mar./Apr. 1987.

* cited by examiner

METHOD AND DEVICE FOR DETERMINING THE ROTATIONAL SPEED OF A POLYPHASE MACHINE OPERATING WITH FIELD ORIENTATION AND WITHOUT A SENSOR

FIELD OF THE INVENTION

The present invention relates to a method for determining a rotational velocity of a transducerless polyphase machine that is operated in a field-oriented manner and to a device for carrying out the method.

BACKGROUND INFORMATION

German Patent Application 195 31 771.8 describes a method in which an established stator-current model space vector and a stator-current actual space vector are, in each case, multiplied by a conjugate complex complex reference space vector and the imaginary components of these products are compared with each other. A system deviation occurring in the imaginary component of the products formed is a measure for the deviation of the model rotor angular velocity from the actual rotor angular velocity. This system deviation is adjusted to zero using an equalizing controller, so that when the system parameters of the real polyphase machine and of the machine model agree, the model rotor angular velocity is also equal to the actual rotor angular velocity. The real components of these products are compared with each other only in response to small stator frequencies, the detected system deviation in the real component of the products formed being used for readjusting the system parameters of the model stator resistance. In this way, a correct readjustment of the model rotor angular velocity is possible in response to small stator frequencies of the polyphase machine. In response to these small stator frequencies, assuming the stator voltage can be preselected, the currents of the real machine and those of the model machine are in practical terms only a function of the parameter of stator resistance and model stator resistance.

One disadvantage of this conventional method is that in response to torques that are high in the range of the breakdown torque, the torque and thus the active components of the stator current changes only slightly in response to a further increase in the rotor angular frequency, and when the breakdown point is exceeded, the system deviation changes its sign. The consequence of this is that the controlled system gain becomes zero and, beyond the breakdown point, even becomes negative, so that a positive feedback arises out of a negative feedback. Thus, using this conventional method and the device for carrying out this method, the polyphase machine can no longer be prevented from falling out of synchronism.

A further disadvantage of this method is that, assuming a stator frequency of zero with an extremely slow change in the rotational velocity, the model rotor angular velocity can no longer be determined using this conventional method.

In addition, the agreement of the identified rotational velocity with the machine rotational velocity is decisively a function of the quality of the machine model that is used. The parameters that are used in the model must therefore be tracked as a function of the operating and working point in order to correctly reproduce the relationships in the machine. In this context, in particular the rotor and stator resistance must be tracked on the basis of changed winding temperatures. Since there is not supposed to be a temperature measurement of the respective winding, the resistances must be identified on-line. In the aforementioned previous German patent application, a method for determining the stator resistance was already indicated, which is particularly necessary in the case of small stator frequencies. The influence of the stator resistance in the middle and upper frequency range is slight.

An identification of the rotor resistance is not possible in roughly stationary operation, since an incorrectly reproduced rotor resistance cannot be distinguished from a mistakenly identified rotational velocity in the stator current. The temperature of the rotor winding cannot simply be measured using measuring techniques, so that frequently the stator and rotor winding temperatures are equated, which, however, is assured only in the first approach. An incorrect rotor resistance nevertheless leads to an incorrectly identified rotational velocity, so that this can not be tolerated particularly in operation without a rotary transducer.

SUMMARY

The present invention provides a method and device for determining a rotational velocity of a transducerless polyphase machine that is operated in a field-oriented manner such that the aforementioned disadvantages no longer occur.

As a result of fact that the detected system deviation in the real portion of the products is referred to for identifying the rotational velocity, in the range of the breakdown torque, which is usually required only in the range of high rotational velocities, the controlled system gain has its largest value in response to a clearly determined sign. In the range of small rotor frequencies, there is, however, a clearly reduced controlled system gain. For this reason, the detected system deviations in the imaginary portion and the real portion of the products formed are, in each case, weighted and totals using a factor, so that from small to very high rotational velocities, the rotational velocity can be correctly identified. Thus a machine's falling out of synchronism can at all times be prevented.

In an advantageous method according to the present invention, a supplementary value is added to a total system deviation. This supplementary value is determined using a flux magnitude modulation, this value being a function, on the one hand, of the selected amplitude and the frequency of the flux magnitude modulation and, on the other hand, decisively of the rotational velocity deviation between the real polyphase machine and the model machine. The larger the rotational velocity error, the larger the value that is added for the total system deviation.

Using this advantageous method, it is possible to precisely identify this rotational velocity irrespective of the quality of the measuring components used, assuming a stator frequency of zero and in response to an extremely slow change of the rotational velocity of the polyphase machine.

In a further advantageous method according to the present invention, a supplementary value is also formed on the basis of a flux magnitude modulation, the value being used for adjusting the model rotor resistance. Since the value additionally determined by the flux magnitude modulation is not needed for identifying the rotational velocity in the middle and upper frequency range, the supplementary value is used in this frequency range for adjusting the model rotor resistance. In this way, the erroneous identification of the rotational velocity caused by an incorrectly reproduced rotor resistance is eliminated, so that in this frequency range the rotational velocity is always correctly identified.

As a result of the method according to the present invention, for determining a rotational velocity of a transducerless polyphase machine that is operated in a field-oriented manner, the rotational velocity of the polyphase machine can now always be precisely identified, from a stator frequency of zero to very high stator frequencies.

In order to further explain the present invention, reference is made to the drawing, in which is schematically represented an exemplary embodiment of a device for carrying out the method according to the present invention for determining a rotational velocity of a transducerless polyphase machine that is operated in a field-oriented manner.

DETAILED DESCRIPTION

In the following descriptive part, a complex variable is indicated by an underline, a space vector by an arrow, a model variable by a circumflex accent, and a conjugate complex variable by an asterisk.

Figure 1:
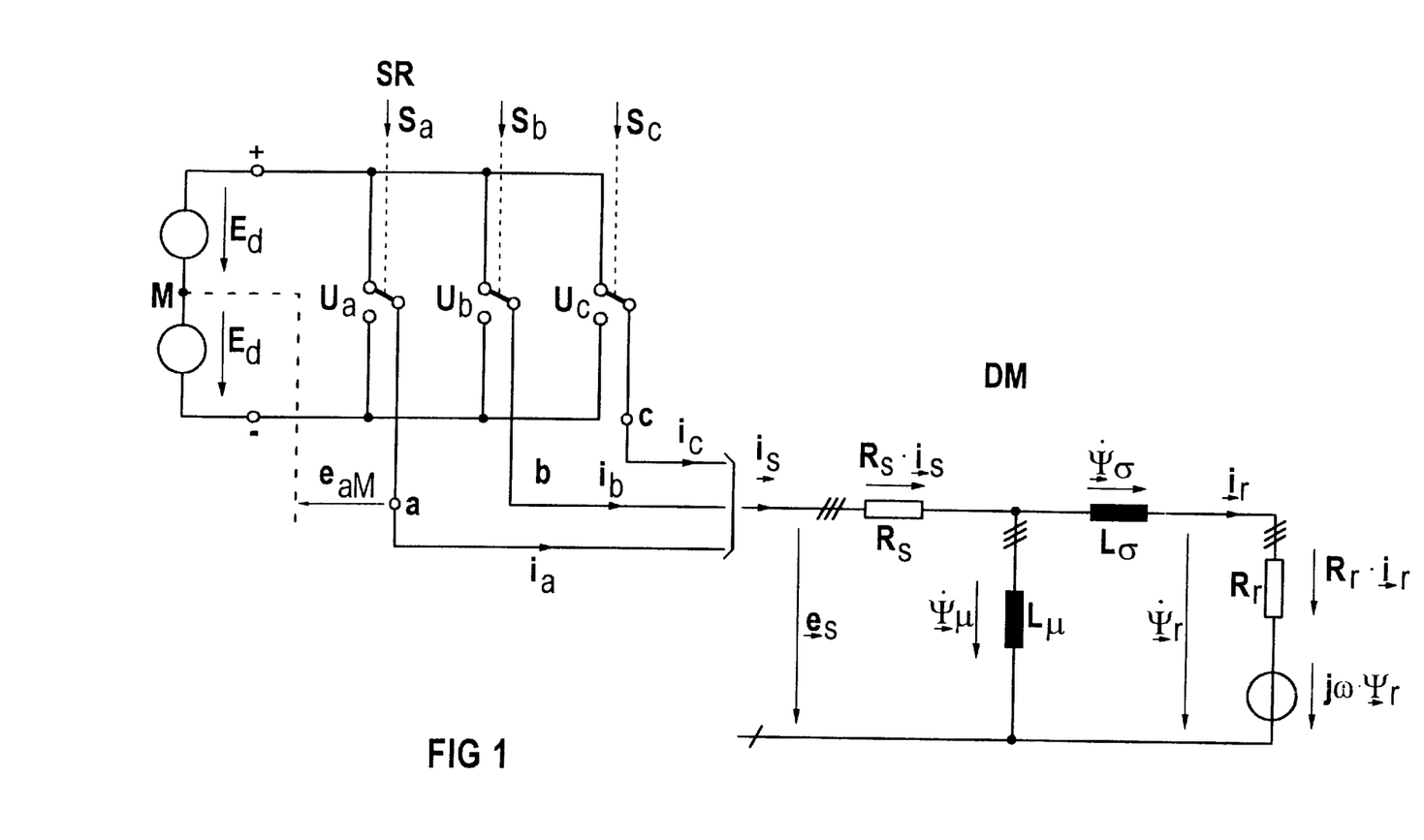
FIG. 1 depicts a basic representation of an induction machine, which is supplied via a pulse-controlled AC converter having essentially constant DC voltage between the input terminals.

In FIG. 1, a pulse-controlled AC converter SR is symbolically represented by changeover switches $U_a$, $U_b$, $U_c$. Changeover switches $U_a$, $U_b$, $U_c$, as a function of bivalent control signals $S_a$, $S_b$, $S_c$, connect terminals a, b, and c to positive terminal "+" on the input side of pulse-controlled AC converter SR, if the associated control signal has the value of 1, and to negative terminal "−", when the value of the control signal is equal to 0. Measured against median potential M between input terminals "+" and "−", a terminal acting as a connection to induction machine DM can only accept voltage values $+E_d$ or $-E_d$. As a result of pulse modulation, it is possible for median value voltages $-\bar{e}_{aM}$, $-\bar{e}_{bM}$, $-\bar{e}_{cM}$, which are formed via a modulation cycle having duration $T_m$, to accept each value between $+E_d$ and $-E_d$. Induction machine DM is symbolically represented by its space vector-equivalent circuit diagram (Γ space vector equivalent circuit diagram) in the fixed-stator reference numeral system.

On the basis of the customary simplifications, the following parameters are sufficient for a complete description of the system of the induction machine:

Stator resistance $R_S$, rotor resistance $R_r$, magnetizing induction $L_\mu$, leakage inductance $L_\sigma$, as well as electrical angular velocity ω of the rotor, it being designated that ω=Ω×p and using Ω as the mechanical angular velocity of the rotor relative to the stator and using p as the number of pole pairs of the machine. Resistance parameters $R_S$ and $R_r$ change in accordance with the associated winding temperatures and inductances L and Lσ with the flux linkages.

From the variables in phases a, b, and c, represented in the example of stator currents $i_a$, $i_b$ and $i_c$, the orthogonal coordinates of the complex stator-current space vector $$\vec{i}_s$$

are obtained in accordance with the following specifications:

$$i_{S\alpha} = -i_b - i_c,$$

$$i_{S\beta} = \frac{1}{\sqrt{3}}(i_b - i_c) \quad (1)$$

$$\underline{i}_s = i_\alpha + j \cdot i_\beta$$

where $j = \sqrt{-1}$

In order to calculate torque M brought about per pole pair, there are many possibilities, e.g., $$M = \mathrm{Im} \cdot \underline{M} = \frac{3}{2}\left(\underline{\Psi}^*_\mu \cdot \underline{i}_s\right) \quad (2)$$

$$\text{where } = \underline{\Psi}^*_\mu = \Psi_{\mu\alpha} - j\Psi_{\mu\beta}$$

The real portion of complex variable $\underline{M}$, which will be described below, does not contribute anything to the actual torque and should therefore be designated as dummy (reactive) torque BG.

In place of conjugate complex space vector $$\underline{\Psi}^*_\mu$$

of the stator flux linkage, in equation (2) conjugate complex space vector $$\underline{\Psi}^*_r$$

derived from the rotor flux linkages can also be used, or even space vector $$\underline{\Psi}^*_r / |\underline{\Psi}^*_r|,$$

the conjugate complex value of the unit space vector in the direction of rotor flux space vector $$\underline{\Psi}^*_r.$$

All of these products of stator-current space vector $$\underline{i}_s$$

and a complex "transformation variable"

$$\underline{T}^*$$

have the property that their imaginary part is proportional to the actual torque, i.e., in response to a stationary symmetrical operation having state variables that oscillate in a temporally harmonic manner, a temporally constant zero-frequency quantity is formed. The same applies to the "dummy variable," the real part of the products. If, in general, the space vector of the conjugate complex transformation variable is designated as $\hat{\underline{T}}^*$ = reference variable for splitting the stator current into $\underline{i}_{S\perp}$ = (torque-) active component of the stator current and $\underline{i}_{S\parallel}$ = (torque-) dummy component of the stator current, then $$\hat{\underline{T}}^* \cdot \underline{i}_S = \hat{\underline{T}}^* \cdot \underline{i}_{S\perp} + \hat{\underline{T}}^* \cdot \underline{i}_{S\parallel} \qquad (3)$$

$$\mathrm{Im}(\hat{\underline{T}}^* \cdot \underline{i}_S) = \mathrm{Im}(\hat{\underline{T}}^* \cdot \underline{i}_{S\perp}) = WG$$

(torques, actual variable)

$$\mathrm{Re}(\hat{\underline{T}}^* \cdot \underline{i}_{S\perp}) = \mathrm{Re}(\hat{\underline{T}}^* \cdot \underline{i}_{S\parallel}) = WG$$

(torques-dummy variable)

In order to establish whether torques M and M from real machine DM and the machine model agree, and thus, given otherwise equal system parameters, also rotational velocities ω and ω agree, it is only necessary to multiply the two space vectors of stator currents $\underline{i}_S$ and $\hat{\underline{i}}_S$ by the same conjugate complex reference variable $\hat{\underline{T}}^*$ and to compare the imaginary parts:

$$\mathrm{Im}\left[\hat{\underline{T}}^* \cdot \hat{\underline{i}}_S\right] - \mathrm{Im}\left[\hat{\underline{T}}^* \cdot \underline{i}_S\right] = \Delta \perp \qquad (4)$$

If variable $\Delta\perp$ is brought to zero by adjusting model parameter ω, then, in any case, stator-current components $\hat{\underline{i}}_{S\perp}$ and $\underline{i}_{S\perp}$ agree that are orthogonal to complex reference variable $\hat{\underline{T}}^*$;

for angular velocities $\hat{\omega}$ and ω this applies with certainty when all other system parameters in real machine DM and in the machine model are also equal.

Figure 2:
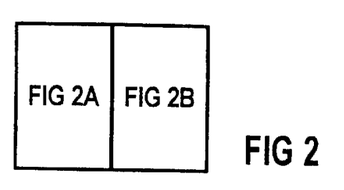
FIG. 2 depicts a block diagram of a particularly advantageous device for carrying out the method according to the present invention.
Figure 2A:
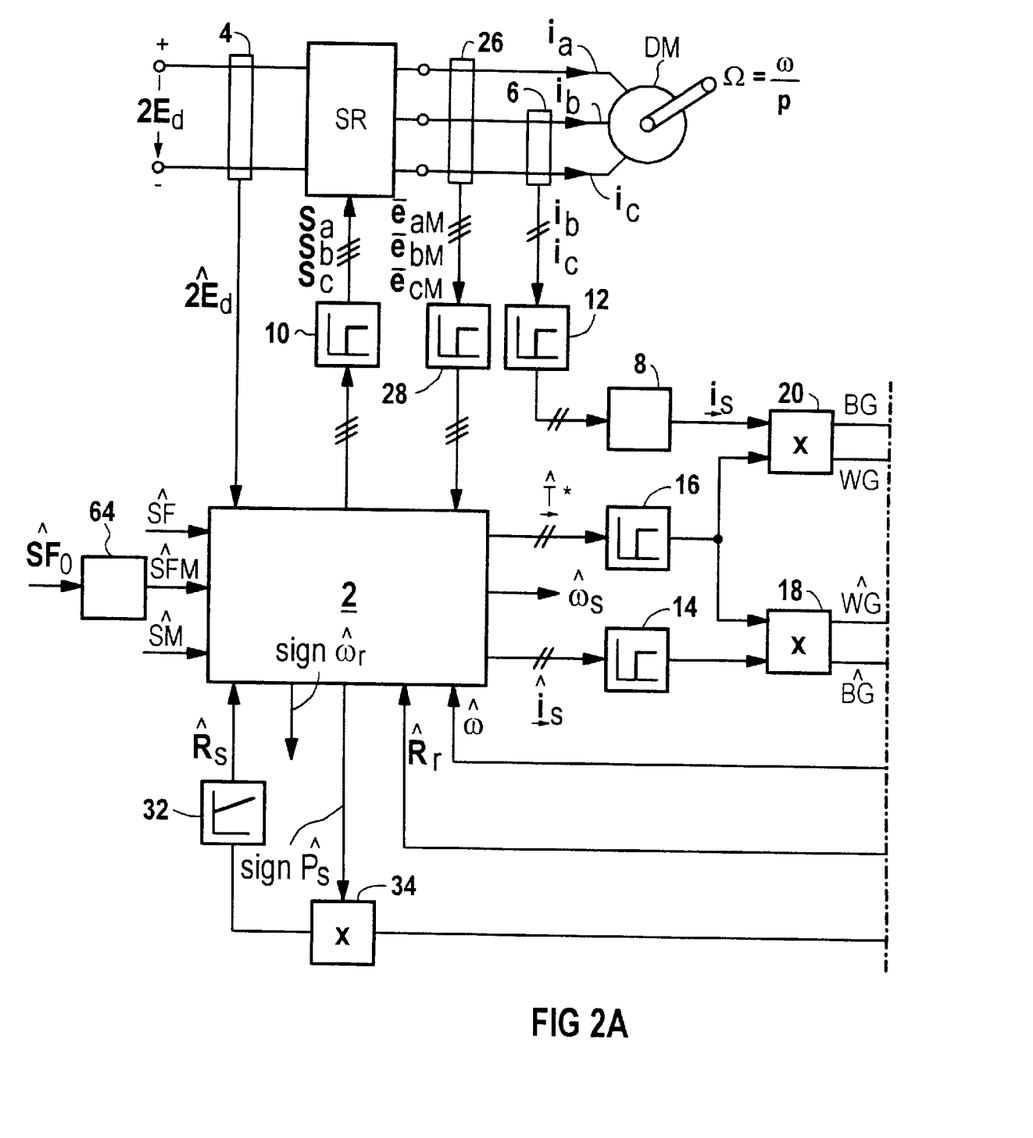
Figure 2B:
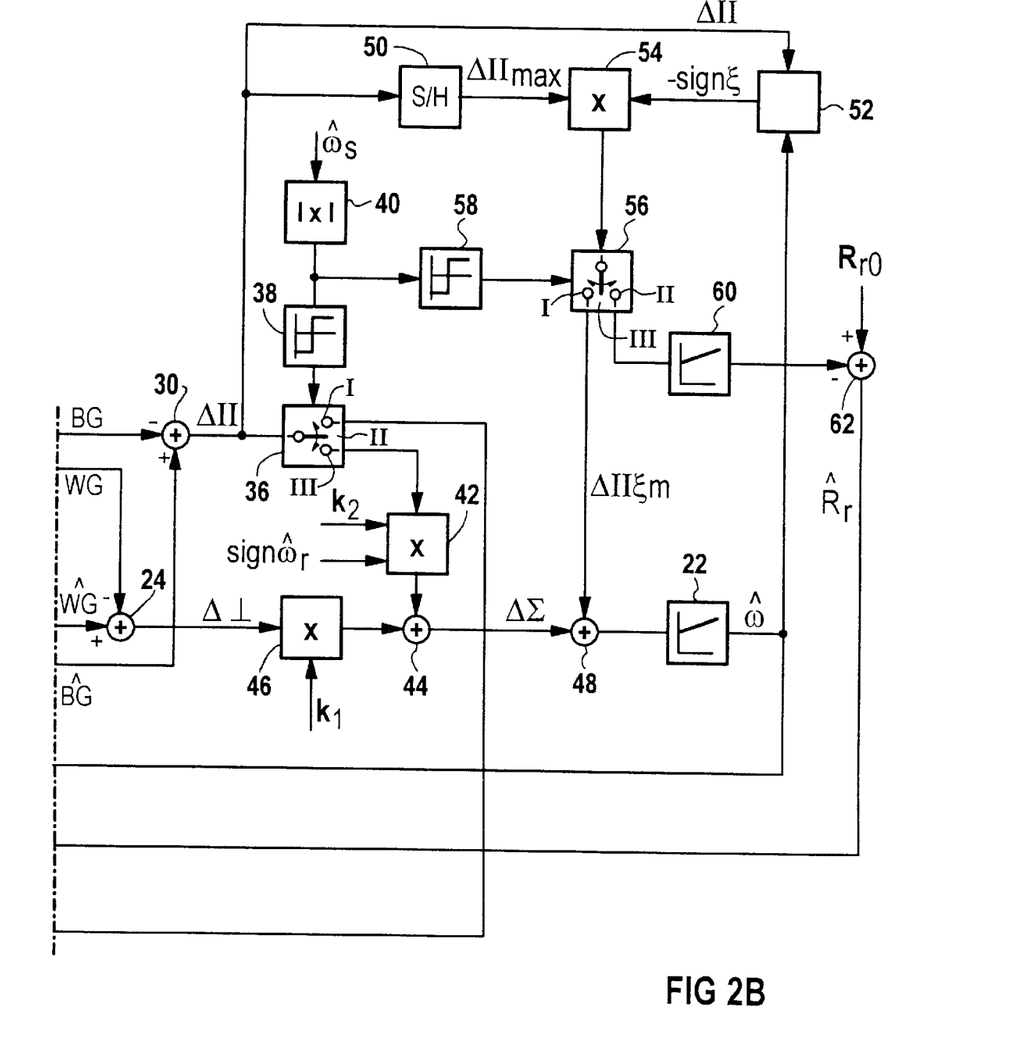

FIG. 2, for example, shows how a conventional method for controlling and regulating an induction machine DM can be supplemented in order to be able to do without direct measurement of angular velocity Ω in machine DM. In this context, it is assumed that a complete machine model contains space vector $\hat{\underline{i}}_S$ of the model stator currents and, in addition, a reference space vector $\hat{\underline{T}}$, whose direction always corresponds with that of space vector $\hat{\underline{\Psi}}_\mu$, of the stator flux linkage or with that of $\hat{\underline{\Psi}}_r$ of the rotor flux linkage or of a direction located in between.

A conventional signal processor 2, which includes inter alia a modulator, a closed-loop control, and a complete machine model, normally realizes the following functions in regularly sequential calculation cycles having constant duration $T_c$:

From setpoint value ŜM for the strength of the magnetic rotating field and setpoint value ŜM for the torque, space vector $\overline{\underline{e}}_S$ of phase voltages $\overline{e}_{aM}$, $\overline{e}_{bM}$, and $\overline{e}_{cM}$ are calculated, which are necessary to reduce the differences between the setpoint and actual values or to maintain the differences at zero, an estimated value $\hat{\omega}$ of the rotor angular velocity being necessary.

Based on active input DC voltage $2E_d$ of the power converter SR, measured by measuring element 4, the associated pulse pattern is calculated for switching variables $S_a$, $S_b$, and $S_c$ the interior current-dependent voltage drop offs of power converter SR being taken into account. For this purpose, stator-current space vector $\hat{\underline{i}}_S$ of the machine model must first be calculated and then be converted to phase values $\hat{i}_a$, $\hat{i}_b$, and $\hat{i}_c$.

In order to be able to calculate stator-current model space vector $\hat{\underline{i}}_S$ and all other necessary or desired variables, the state variables, e.g., space vectors of stator flux linkage $\hat{\underline{\Psi}}_\mu$ and space vector of rotor flux linkage $$\hat{\underline{\psi}}_r$$

must again be determined in advance in accordance with the controllers of the system. At the end of the calculation cycle having duration $T_c$, the pulse pattern of switching variables $S_a$, $S_b$, $S_c$ are determined. The associated switching actions are carried out within the next modulation cycle of total duration $T_m = N \times T_c$, N being a whole number, at the previously calculated time points of the semiconductor switches of power converter SR. At the end of the observed calculation cycle, not only the future value of stator-current model space vector $$\hat{\underline{i}}_s$$

is known at the end of the just begun modulation cycle, but the next intermediate value of stator-current model space vector $$\hat{\underline{i}}_s,$$

which will occur at the end of the next calculation cycle can also be determined from the calculated pulse pattern and stored in memory. Associated currents $i_a$, $i_b$ and $i_c$ in real machine DM occur with a delay of $T_c$. Until they have been measured by measuring element 6 and are available in converted form at resolver 8, usually a further dead time having duration $T_c$, passes, or a small fraction of this duration. These effects are symbolically taken into account in FIG. 2 through dead time elements 10 and 12. Irrespective of number N of calculation cycles, which occur in one modulation cycle, in every calculation cycle the new value of stator-current actual space vector $$\underline{i}_s,$$

of the measured machine currents is compared with associated stator-current model space vector $$\hat{\underline{i}}_s$$

of the currents of the machine model, which was already calculated and stored in memory a plurality of calculation cycles previously, as is symbolized in FIG. 2 by dead time element 14 having dead time $T_\Sigma$, which is derived from the sum of the other dead times.

If, as reference variable for splitting stator-current space vector $$\underline{i}_s$$

and stator-current model space vector $$\hat{\underline{i}}_s,$$

a conjugate complex value of space vector $$\hat{\underline{T}}$$

is used which is chosen as reference variable, the conjugate complex value also being situated in the past b (time period) $T_\Sigma$ (dead time element 16), in order to form the variables $$\hat{W}G = \text{Im}(\hat{\underline{T}}^* \cdot \hat{\underline{i}}_s); \hat{B}G = \text{Re}(\hat{\underline{T}}^* \cdot \hat{\underline{i}}_s)$$

and $$WG = \text{Im}(\hat{\underline{T}}^* \cdot \underline{i}_s); BG = \text{Re}(\hat{\underline{T}}^* \cdot \underline{i}_s),$$

in multiplying elements 18 and 20 in accordance with the above equation (3), then active variables WG and $\hat{W}$G agree directly with the torques of real machine DM and the machine model, down to an identical factor. For adapting the parameter of rotor velocity ω of the machine model, provision is made for an equalizing controller 22, whose input variable, system deviation $\Delta\perp$ of imaginary parts $\hat{W}$G and WG of the products formed, is formed in comparator 24. Usually, variables WG and $\hat{W}$G corresponding to the torques are themselves not temporally constant in stationary operation, because the input voltages for the real machine and for the machine model proceed in a pulse-modulated manner. However, if both voltages agree in the same way as all system parameters, then, in the equalized state, this system deviation $\Delta_\perp$ is theoretically equal to zero, practically a close approximation. This means that, for example, amplification and reset time of utilizing controller 22 should be selected such that a clearly better dynamic performance results than is the case with other methods. In this connection, an essential role is played by the measure, according to the present invention, of permitting a dead time to occur in the path of signals $$\hat{\underline{i}}_s \text{ and } \hat{\underline{T}}^*.$$

As was already mentioned, the pulse pattern for switching signals $S_a$, $S_b$, $S_c$ is calculated such that, using active input DC voltage $2E_d$ and taking into consideration the interior voltage drop offs of power converter SR, desired median value $$\overline{\underline{e}}_s$$

of the machine voltage space vector is obtained for the next modulation cycle. If the precision of this controlling is not sufficient to assure for real machine DM and the machine model the presupposed equal pattern of the space vector of the input voltages, the median values formed via a modulation cycle of three output voltages $\overline{e}_{aM}$, $\overline{e}_{bM}$ and $\overline{e}_{cM}$ of power converter SR can be measured via a measuring element 26 and can be used as actual values for three voltage correction closed-loop controls, a dead time, however, occurring in its turn which is taken into account in FIG. 2 by dead time element 28.

From another point of view, in order to realize the most rugged method possible, it is advantageous that reference variable select the conjugate complex space vector of stator flux linkages $$\underline{\Psi}_\mu^*.$$

Parameter $L_\mu$ shows very strong dependence on the flux linkages, but usually only the dependence of fundamental wave inductance $L_{\mu f}$ on the magnitude of space vector $$\underline{\Psi}_\mu$$

is taken into account because a precise reproduction of momentary magnetizing currents $i_{\mu a,b,c}$ is too costly as a function of the momentary values of the flux linkages. Since magnetizing currents $i_{\mu a,b,c}$ do not supply any contribution to the torque, as long as the space vector of magnetizing currents $$\underline{i}_\mu$$

remains in the same direction as the space vector $$\underline{\hat{\Psi}}_r$$

of the rotor flux linkage, differences between magnetizing current space vectors $$\underline{i}_\mu \text{ and } \underline{\hat{i}}_\mu$$

have no influence on system deviation $\Delta\bot$ of torques-active variables $\hat{WG}$ and WG and thus also not on the time characteristic of the output variable of rotor angular velocity ω of equalizing controller 22.

As a result of the measures described above, it is ensured that stator-current components $$\underline{i}_{S\bot} \text{ and } \underline{\hat{i}}_{S\bot}$$

of real polyphase machine DM and the machine model agree, in the dynamic mode considerably and in the stationary mode all but ideally, if that is possible by adaptation of the parameter of rotor angular velocity ω in the machine model. In the case of small stator frequencies, with a preselected voltage, the currents of real machine DM and also those of the machine model are practically only determined, in the stationary mode, by the parameter of stator resistance $R_S$ and $\hat{R}_S$. Stator resistance $R_S$ changes very considerably according to the winding temperature, so that if the model value does not follow stator resistances $R_S$, system deviation $\Delta\bot$ at the input of equalizing controller 22 is not equal to zero, even if model rotor angular velocity $\hat{\omega}$ and rotor angular velocity ω agree. That means that a correct determination of model rotor angular velocity $\hat{\omega}$ is then not possible.

Since adjusting the parameter of model rotor angular velocity $\hat{\omega}$ does nothing to change the fact that the voltages of real machine DM and the machine model agree as far as technically possible, system deviation $\Delta\bot$, in response to small stator frequencies, remains different from zero for as long as the differences between stator resistance $R_S$ and model stator resistance $\hat{R}_S$ remain.

This shortcoming can be removed by comparing dummy torques $\hat{BG}$ and BG, not previously used, also called torques-dummy variables. If the parameters of stator resistance $R_S$ and model stator resistance $\hat{R}_S$ do not agree, e.g., in response to low frequencies, then, in response to equal voltages, this leads not only to differences in torque-forming current components $$\underline{i}_{S\bot} \text{ and } \underline{\hat{i}}_{S\bot}$$

of real machine DM and of the machine model, but also to differences between flux-forming current components $$\underline{i}_{S\|} \underline{\hat{i}}_{S\|}$$

of real machine DM and the machine model and thus also to inequality of dummy torques BG and $\hat{BG}$. If difference $\Delta\|$ between these dummy torques BG and $\hat{BG}$ is established in a further comparator 30, then the parameter of model stator resistance $\hat{R}_S$ can be adjusted via a further equalizing controller 32 until this detected system deviation $\Delta\|$ takes on the value of zero. In response to changing the power flow direction, i.e., if braking power is fed back to current converter SR, then the control direction of further equalizing controller 32 is reversed. For this purpose, system deviation $\Delta\|$ for example, of torques-dummy variables $\hat{BG}$ and BG can be multiplied by sign $\hat{P}_S$ of stator power $\hat{P}_S$, for which purpose provision is made for a multiplying element 34.

In response to medium and large stator frequencies, it can be expedient to reduce the amplifying effect of controller 32.

This formed system deviation $\Delta\|$ is supplied via a changeover switch 36 (position I) to further equalizing controller 32, the control input of this changeover switch 36 being connected to an output of a controlling element 38. On the input side, this controlling element 38 is combined with an output of an absolute value generator 40, to whose input is applied a model stator frequency $\hat{\omega}_S$ that is detected by signal processing 2. The second output (position III) of changeover switch 36 is connected via a multiplier 42 in a second input of an adder 44. The first input of this adder 44 is combined with an output of a multiplier 46, which on the input side is connected to the output of comparator 24, at whose output system deviation $\Delta\bot$ of torques active variables $\hat{WG}$ and WG is applied. On the output side, adder 44 is connected via a further adder 48 to equalizing controller 22. In each case, at the second input of multipliers 42 in 46, a weighting factor K2 and K1 is applied. Also sign $\hat{\omega}_r$ of estimated rotor angular frequency $\hat{\omega}_r$ is supplied to multiplier 42 on the output side. For changeover switch 36, a changeover switch having a neutral setting is provided.

In addition, further comparator 30 is, on the one hand, combined with a device 50 for recording peak values and, on the other hand, with a device 50 for recording the sign of a phase shift angle ξ. A second input of this device 50 for detecting the sign is connected to the output of equalizing controller 22. On the output side, these devices 50 and 50 are, in each case, connected to an input of a multiplier 54, which, on the output side, is combined, using a further changeover switch 56 (position I), with an input of adder 48. The control input of this further changeover switch 56 is connected to an output of a further controlling element 58, which is joined on the input side to the output of absolute-value generator 40. The second output of further changeover switch 56 (position II) is combined with a further equalizing controller 60, which on the output side is connected via an adder 62 to a parameterizing input of signal processing 2. At the second input of this adder 62, a precontrol value R,0 is applied for the rotor resistance adaptation. As device 50 for recording peak values, a sample-and-hold element is provided, device 50 for recording the sign having a phase detector, a comparator, and an inverter. A block diagram of a device 52 of this type is explicitly not provided, since a circuit of this type is known to the worker skilled in the art. Similarly, further specific embodiments for this device 52 are possible, in accordance with the present invention.

As can be seen from this representation, a transducer 64 is connected upstream of signal processing 2, a value of a nominal stator flux $\hat{S}F_0$ of polyphase machine DM being applied at the input of transducer 64. At the output side, a low-frequency modulated flux magnitude signal $\hat{S}FM$ is applied, which is calculated in accordance with the equation $$\hat{S}FM^2 = [0,72 + 0,28 \cdot \sin(\omega_m \cdot t)] \cdot \hat{S}F_0^2$$

or according to the equation $$\hat{S}FM = [87,5\% + 12,5\% \cdot \sin(\omega_m \cdot t)] \cdot \hat{S}F_0.$$

Which equation is used in transducer 64 depends on whether signal processing 2 can have the square root extracted or not.

As can also be seen from this representation, changeover switches 36 and 56 are actuated as a function of the value of model stator frequency $\hat{\omega}_s$. In this context, it is not only the absolute value of model stator frequency $\hat{\omega}_s$ that is of interest. Therefore, from the detected value of model stator frequency $\hat{\omega}_s$, a quantity is formed before this value is used for controlling elements 38 and 58. Changeover switches 36 and 56 can remain in three positions I, II, and III.

In a model stator frequency $\hat{\omega}_s = 0$, changeover switch 36 is in position II (neutral setting) and changeover switch 56 in position I. In a model stator frequency equivalent to $|\hat{\omega}_s| > 2\%$, $\omega_0$ giving the type point frequency of polyphase machine DM, changeover switch 36 is in position I and changeover switch 56 is in position II. If the magnitude of model stator frequency $\hat{\omega}_s > 10\%$ $\omega_0$, changeover switch 36 changes to position II, whereas this changeover switch 36 changes to position III, if for model stator frequency $|\hat{\omega}_s| > 100\%$ $\omega_0$ applies. In this value of model stator frequency $\hat{\omega}_s$, changeover switch 56 changes to position III (neutral setting). If changeover switch 36 is in position II or changeover switch 56 is in position I or II, then signal processing 2 receives a low-frequency modulated flux magnitude signal $\hat{S}FM$ in place of flux setpoint value $\hat{S}F$. However, the possibility remains of low-frequency modulated flux magnitude signal, $\hat{S}FM$ for example, being supplied for a predetermined period of time to signal processing 2.

Weighting factors K1 and K2, whose values can be varied between zero and one, change their values as a function of the torque. The value of weighting factor K1 in response to low torques ($<50\%$ $M_{breakdown}$) is equal to one, and the value of weighting factor K2 is equal to zero. In response to high torques (80% to 100% $M_{breakdown}$), the value of weighting factor K1=0 and of weighting factor K2=1. The transition between these two limit cases can, in this context, occur either continuously, with rising loads, or suddenly, after a certain load. In response to a sudden change of weighting factors K1 and K2, it is sensible to provide the transition with a hysteresis and thus to avoid a constant changing between the different controller input variables. The sign required of rotor angular frequency $\omega_r$, which also agrees with the sign of the torque, is detected, in this context, by the complete machine model of signal processing 2.

$$0 \leq |\hat{\omega}_s| \leq 2\% \ \omega_0:$$

In this frequency range of model stator frequency $\hat{\omega}_s$, changeover switch 36 is in position II and changeover switch 56 in position I and low-frequency modulated flux magnitude signal $\hat{S}FM$ is supplied to signal processing 2. The amplitude of this stator flux magnitude modulation is, in this context, set so that the torque that is attainable using the lowest value of the modulated stator flux is always higher than the, for example, maximum torque in response to nominal stator flux $\hat{S}F_0$, which is usually demanded in the traction in response to these stator frequencies.

Frequency $\omega_m$ of the flux magnitude modulation must, in this context, be selected to avoid torsion oscillations such that the frequency is significantly smaller than the lowest mechanical resonance frequency of the drive train. The latter is, for example, in the traction for high-performance locomotives in the area of 20 Hz. In addition, skin effects are to be avoided in the rotor. For these reasons, is beneficial, for example, for frequency $\omega_m$ of the flux magnitude modulation, to select 5 Hz. Because the cut-off frequency of the torque controller of a field-oriented controlling method usually is more than one order of magnitude higher, the torque nevertheless can be further controlled at its desired value without any problem.

In the case of a difference between the identified rotational velocity $\hat{\omega}$ and rotating velocity $\omega$ of polyphase machine DM, on the basis of the stator flux magnitude modulation, a system deviation $\Delta\|$ different from zero of torques-dummy variables $\hat{B}G$ and BG arises in the stator currents between model and machine that are directed parallel to the transformation variable, the stator currents, in this context, corresponding to a periodic quantity that oscillates with flux magnitude modulation frequency $\omega_m$. Peak value $\Delta\|_{max}$, in this context, is a function, on the one hand, of the selected amplitude and the frequency of the stator flux magnitude modulation, but, on the other hand, also significantly of the rotational velocity deviation between the machine and the model. The greater the rotational velocity error, the greater the peak value of system deviation $\Delta\|$ of torques-dummy variables BG and $\hat{B}G$, so that peak value $\Delta\|_{max}$ delivers supplementary information for the rotational velocity measurement. Information concerning the sign of the rotational velocity deviation is however not contained here.

A system deviation $\Delta\perp$ of torques-actual variables WG and $\hat{W}G$, which, in the event of a rotational velocity difference $\hat{\omega} - \omega$ between model and machine in flux magnitude modulation, also corresponds to the periodic quantity pulsating at modulation frequency $\omega_m$, is compensated for using equalizing controller 22 and is interpreted as pulsating rotating velocity $\hat{\omega}$. This observed turning circle frequency $\hat{\omega}$ is then composed generally of a steady component $\hat{\omega}_-$ (median value) and a superimposed alternating component $\hat{\omega}_\sim$.

Figure 3:
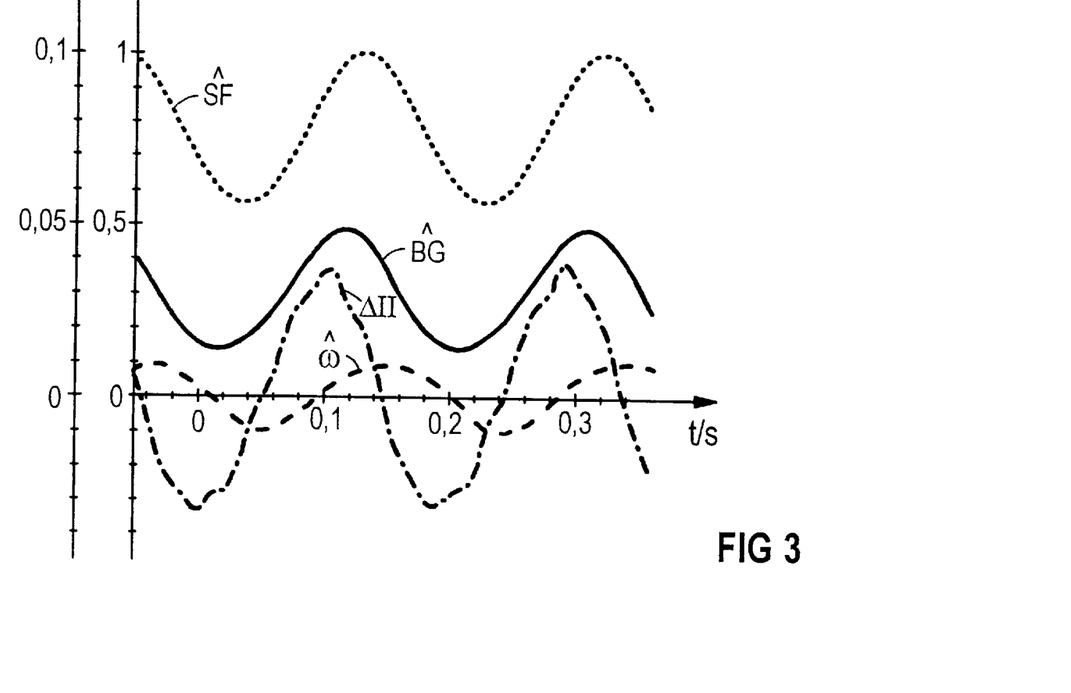
FIGS. 3 and 4 represent the interrelationships in response to the modulation of the stator flux magnitude.
Figure 4:
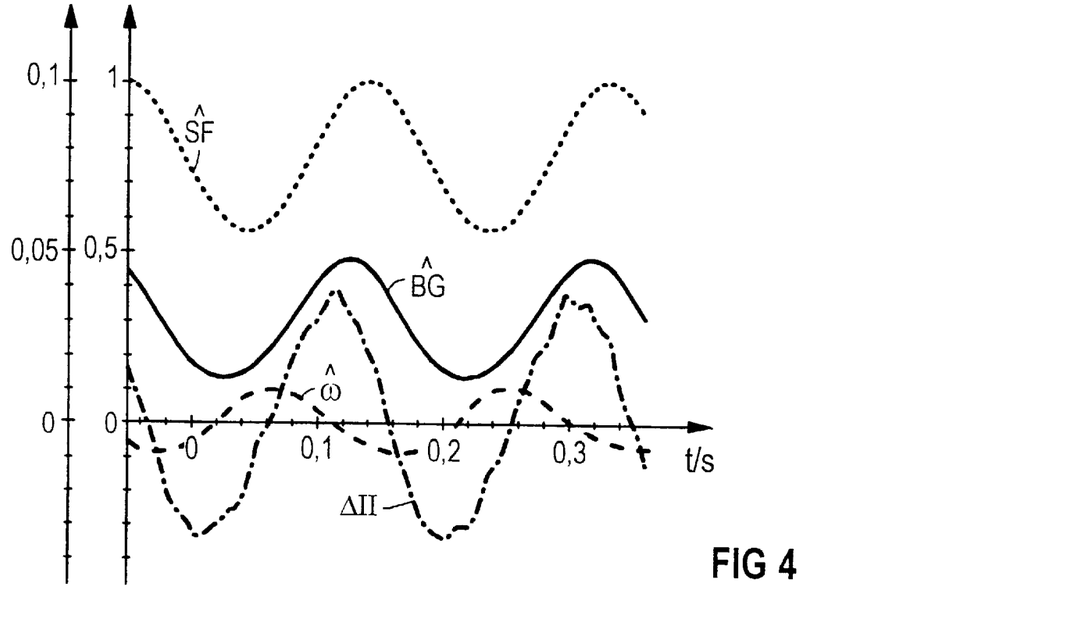

In FIGS. 3 and 4, the connections in the modulation of the stator flux magnitude are depicted. In FIG. 3 machine turning circle frequency $\omega$ is greater than identified median turning circle frequency $\hat{\omega}_-$, whereas in FIG. 4, machine turning circle frequency $\omega$ is smaller than the identified medium turning circle frequency $\hat{\omega}_-$. Median model rotational velocity $\omega_-$ is, in the example, in every case zero. By comparing the representations of FIG. 3 with FIG. 4, it becomes clear that alternating component $\hat{\omega}$ which is superimposed on identified median rotational velocity $\hat{\omega}_-$, now lags behind ($\omega > \hat{\omega}_-$) and now runs at higher velocity ($\omega < \hat{\omega}_-$) than system deviation $\Delta\|$ of torques-dummy variables BG and $\hat{B}G$ as a function of present rotational velocity difference $\hat{\omega} - \omega$ between model and machine. The sign of phase angle $\xi$ between this system deviation $\Delta\|$ and superimposed alternating component $\hat{\omega}_-$ of observed turning circle frequency $\hat{\omega}$, which is measured over a period of the stator flux magnitude modulation using known methods, thus delivers in an unambiguous way the information as to whether the identified rotational velocity is too large or too small. The following applies:

$$\xi < 0,$$

i.e., alternating component $\hat{\omega}_-$ of observed turning circle frequency $\hat{\omega}$ lags behind system deviation $\Delta\|$. From this, it follows that this observed turning circle frequency $\hat{\omega}$ must be increased.

$$\xi > 0,$$

i.e., superimposed alternating component $\hat{\omega}_-$ of observed turning circle frequency $\hat{\omega}$ runs ahead of system deviation $\Delta\|$. From this, it follows that this observed turning circle frequency $\hat{\omega}$ must be lowered.

Peak value $\Delta\xi_{max}$ of system deviation $\Delta\|$ of torques-dummy variables $\hat{B}G$ and BG in is a measure for the existing absolute deviation between identified rotational velocity $\hat{\omega}$ and machine rotational velocity $\omega$ so that with the assistance of equalizing controller 22 the periodic quantity of this system deviation $\Delta\|$ can be adjusted, the sign of phase angle $\xi$ determining the control direction.

Through the use of low-frequency modulated flux magnitude signal $\hat{S}FM$, in the event of a difference between model turning circle frequency $\hat{\omega}$ and machine turning circle frequency $\omega$, there arises a system deviation $\Delta\|$ of torques-dummy variables $\hat{B}G$ and BG, which, in this context, basically corresponds to a periodic quantity oscillating with modulation frequency $\omega_m$. The measurement of peak value $\Delta\|_{max}$ which takes place using known methods, is described in the depicted example through a sample-and-hold element. By multiplying by the negated sign of phase shift angle $\xi$ between system deviation $\Delta\|$ and alternating component $\hat{\omega}$ of identified rotational velocity $\hat{\omega}$, alternating component $\hat{\omega}_-$ being measured using known methods over a period of the stator flux magnitude modulation, the control direction is established in an unambiguous manner. Using changeover switch 56, this product $\Delta\|\xi_m$ is additionally used for identifying the rotational velocity. In this context, the switch over takes place as a function of the magnitude of model stator frequency $\hat{\omega}_S$ which is measured by a complete machine model of signal processing 2. This variable $\Delta\|\xi_m$ is additionally used for identifying the rotational velocity, in that it is added to total system deviation $\Delta\Sigma$ with the assistance of adder 48.

$$2\% \; \omega_0 < |\hat{\omega}_S| < 100\% \; \omega_0:$$

In this frequency range of model stator frequency $\hat{\omega}_S$, changeover switch 56 is in position II and changeover switch 36 is initially in position I and then in position II, and calculated product $\Delta\|\xi_m$, from peak value $\Delta\|_{max}$ of system deviation $\Delta\|$ and the negated sign, is not additionally used for identifying the rotational velocity, but rather for the rotor resistance adaptation. In this context, this value of product $\Delta\|\xi_m$ using further equalizing controller 60 is adjusted to zero in that, in the machine model, a component of signal processing 2, the parameter of rotor resistance $\hat{R}_r$ is adjusted.

In order that equalizing controller 60 should only compensate for its deviations, a precontrol is provided for. As the precontrol variable, rotor resistance $R_{r0}$ of polyphase machine DM is provided for. As a result of this rotor resistance adaptation, rotational velocity $\omega$ is no longer identified erroneously.

$$|\hat{\omega}_S| < 100\% \; \omega_0$$

In this frequency range of model stator frequency $\hat{\omega}_S$, also known as the field weakening range, changeover switches is 36 and 56 are each in position III and equalizing controller 22 is supplied with detected system deviation $\Delta\|$ in addition to system deviation $\Delta\perp$. In the case of loading, in response to high torques, the input signal of equalizing controller 22 is ended, which prevents the controlled system gain from becoming zero, and no positive feedback can arise from the negative feedback. As a result, it is assured that in the vicinity of the breakdown torque, rotational velocity $\omega$ of polyphase machine DM can clearly be identified. The suppression of individual system deviations $\Delta\perp$ and $\Delta\|$ occurs with the assistance of weighting factors K1 and K2 which can take on the values of zero and one. For a continuous (stepless) transition from one system deviation $\Delta\perp$ to another system deviation $\Delta\|$, as input signal of equalizing controller 22, weighting factors K1 and K2 can change in a contrary sense using a constant function, in particular a linear function, between the values 1 and 0, as well as 0 and 1. In this overlapping range of weighting factors K1 and K2, total system deviation $\Delta\Sigma$ is used as input signal of equalizing controller 22.

As a result of this method according to the present invention, there is now a method with which rotational velocity $\omega$ of a transducerless polyphase machine DM, that is operated in a field-oriented manner, can be identified in the overall rotational velocity range, so that there is no need for a rotational velocity measurement even in high-value drives. In addition, breakdown protection is assured. Additionally, the parameters (stator and rotor resistance) of polyphase machine DM, which are a function of the operating and working points, are reproduced on-line in the machine model, so that a correct identification of the rotational velocity is made possible.

What is claimed is:

1. A method for determining a rotation velocity of a transducerless polyphase machine that in operating in a field-oriented manner, comprising the steps of:

determining a stator-current model space vector and a conjugate complex reference space vector using a complete machine model as a function of a flux setpoint value, a torque setpoint value, an intermediate circuit DC voltage value, measured power converter output voltage values, and system parameters;

multiplying each of a measured stator-current model space vector and the determined stator-current model space vector by the conjugate complex reference space vector to form a first product and a second product, respectively;

forming a first system deviation of imaginary components by comparing an imaginary component of the first product to an imaginary component of the second product;

forming a second system deviation of real components by comparing a real component of the first product to a real component of the second product;

weighting the first system deviation of the real components using a sign of a model rotor angular frequency of the polyphase machine and a first factor;

weighting the second system deviation of the imaginary components using a second factor;

adding the weighted first system deviation of the real components to the weighted second system deviation of the imaginary components to form a weighted total system deviation;

adjusting the model rotor angular velocity as a function of the weighted total system deviation so that the weighted total system deviation becomes zero; and determining the rotational velocity of the transducerless polyphase machine as a function of the model rotor angular velocity.

2. The method according to claim 1, further comprising the steps of:

providing a low-frequency modulated flux magnitude signal as the flux magnitude setpoint value;

measuring a sign of a phase shift between the model rotor angular velocity and the second system deviation of the real components;

measuring a peak value of the second system deviation of real components;

negating the sign of the phase shift between the model rotor angular velocity and the second system deviation of the real components;

multiplying the peak value with the negated sign to form a third product; and superimposing the third product on the measured total system deviation.

3. The method according to claim 1, further comprising the steps of:

providing a low-frequency modulated flux magnitude signal as the flux magnitude setpoint value;

measuring a sign of a phase shift angle between the model rotor angular velocity and the second system deviation of the real components;

measuring a peak value of the second system deviation of the real components;

negating the sign of the phase shift between the model rotor angular velocity and the second system deviation of the real components;

multiplying the peak value with the negated sign to form a third product; and adjusting a rotor resistance parameter of the system parameters using the third product so that the third product becomes zero.

4. The method according to claim 1, further comprising the step of:

varying the first factor and the second factor between zero and one and contrary to each other.

5. The method according to claim 1, wherein, in a field weakening range of the polyphase machine, the first factor is set to zero for high torques, and the second factor is set to one.

6. The method according to claim 4, wherein the varying step includes varying the first factor and the second factor as a function of magnitudes of a model stator frequency of the polyphase machine and the estimated value of the rotor angular frequency.

7. The method according to claim 2, wherein the adding step is performed in response to a magnitude of a model stator frequency of the polyphase machine that is one of greater than and equal to two percent of a type point frequency of the polyphase machine.

8. The method according to claim 3, wherein the adjusting the rotor resistance parameter step is performed in response to a magnitude of a model stator frequency of the polyphase machine that is one or greater than and equal to two percent of a type point frequency of the polyphase machine.

9. The method according to claim 7, wherein the low-frequency modulated flux magnitude signal is turned on only for a selected time.

10. A device for determining a rotation velocity of a transducerless polyphase machine that in operating in a field-oriented manner, comprising:

a signal processor including a complete machine model of the polyphase machine, a closed-loop controller, and a modulator;

a first multiplier and a second multiplier, the signal processor applying a conjugate complex reference space vector to a first input of the first multiplier and a first input of the second multiplier, the signal processor applying a stator-current module space vector to a second input of the first multiplier, a first output of the first multiplier providing an imaginary component of a product formed by the first multiplier and a second output of the first multiplier providing a real component of the product formed by the first multiplier, a first output of the second multiplier providing an imaginary component of a product formed by the second multiplier and a second output of the second multiplier providing a real component of the product formed by the second multiplier;

a current measuring element, a second input of the second multiplier being coupled to an output of the current measuring element using a resolver;

a first comparator, the first output of the first multiplier and the first output of the second multiplier being coupled by the first comparator;

a second comparator, the second output of the first multiplier and the first output of the second multiplier being coupled by the second comparator;

a first adder, an output of the first comparator being coupled to a first input of the first adder via a third multiplier, an output of the second comparator being coupled to a second input of the first adder via a fourth multiplier;

a first equalizing controller, an output of the first adder providing, via the first equalizing controller, a model rotor angular velocity to a first parameter input of the signal processor;

a first changeover switch coupled upstream of the fourth multiplier; and an absolute-value generator having a downstream controlling element for the first changeover switch, the signal processor applying a model stator frequency to the absolute value generator, the absolute value generator coupling the model stator frequency to a controller input of the first changeover switch.

11. The device according to claim 10, further comprising:

a transducer coupled upstream of the signal processor;

a peak value detector, the output of the second comparator being coupled to the peak value detector;

a sign of phase shift angle detector, the output of the second comparator being coupled to the sign of phase shift angle detector;

a fifth multiplier, an output of the peak value detector and an output of the sign of phase shift angle detector coupled to inputs of the fifth multiplier;

a second adder, a first input of the second adder coupled to the output of the first adder;

a second changeover switch, an output of the fifth multiplier coupled to a second input of the second adder via the second changeover switch, an output of the second adder coupled to the first equalizing controller, a control input of the second changeover switch being coupled via a further controlling element with the output of the absolute-value generator.

12. The device according to claim 10, further comprising:

a transducer coupled upstream of the signal processor;

a peak value detector, the output of the second comparator coupled to the peak value detector;

a sign of phase shift angle detector, the output of the second comparator coupled to the sign of phase shift angle detector;

a third multiplier, an output of the peak value detector and an output of the sign of phase shift detector coupled to inputs of the third multiplier;

a second changeover switch;

a second equalizing controller, an output of the third multiplier being coupled to the second equalizing controller via the second changeover switch; and a further controlling element, a control input of the second changeover switch coupled via the further controlling input to the output of the absolute-value generator.

13. The device according to claim 12, further comprising:

a second adder, an output of the second equalizing controller being coupled to a first input of the second adder, a second input of the second adder receiving a precontrol value for rotor resistance adaptation, an output of the second adder providing a model rotor resistance to a second parameter input of the signal processor.

14. The device according to claim 10, wherein the peak value detector includes a sample-and-hold element.

15. The device according to claim 10, wherein the signal of the phase shift angle detector includes a phase detector, a third comparator, and an inverter.

16. The device according to claim 10, wherein the first changeover switch has a neutral setting.

17. The device according to claim 10, wherein the downstream controlling element includes a third comparator.

* * * * *